D. BLUMBERG.
AUTO TRACTION DEVICE.
APPLICATION FILED DEC. 10, 1917.
1,291,380.
Patented Jan. 14, 1919.
3 SHEETS—SHEET 3.
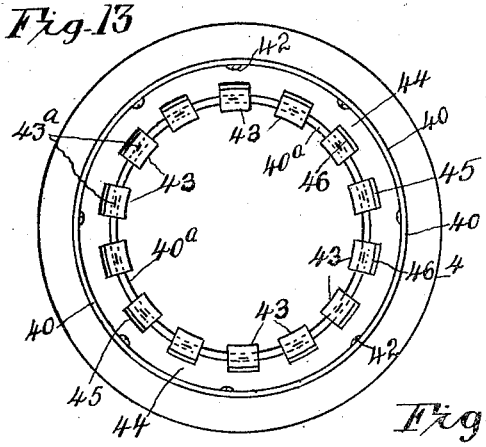
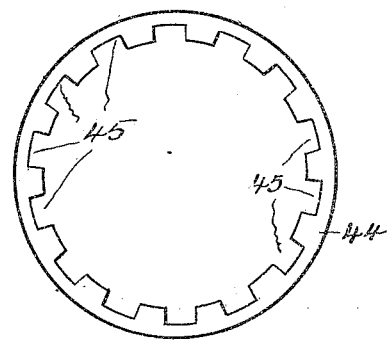
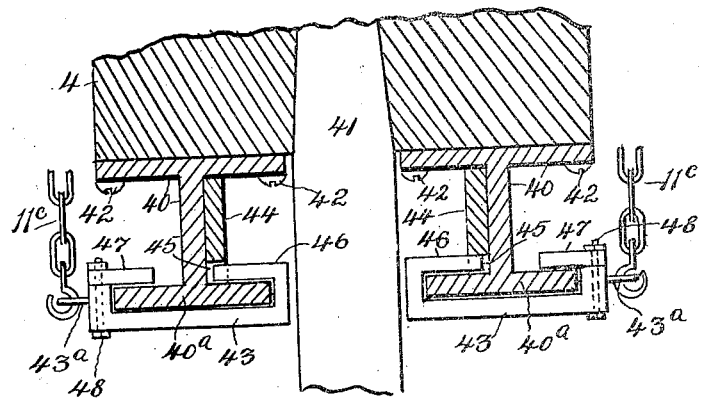
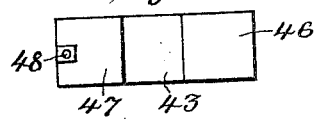
INVENTOR
David Blumberg,
BY Geo. D. Phillips
his ATTORNEY

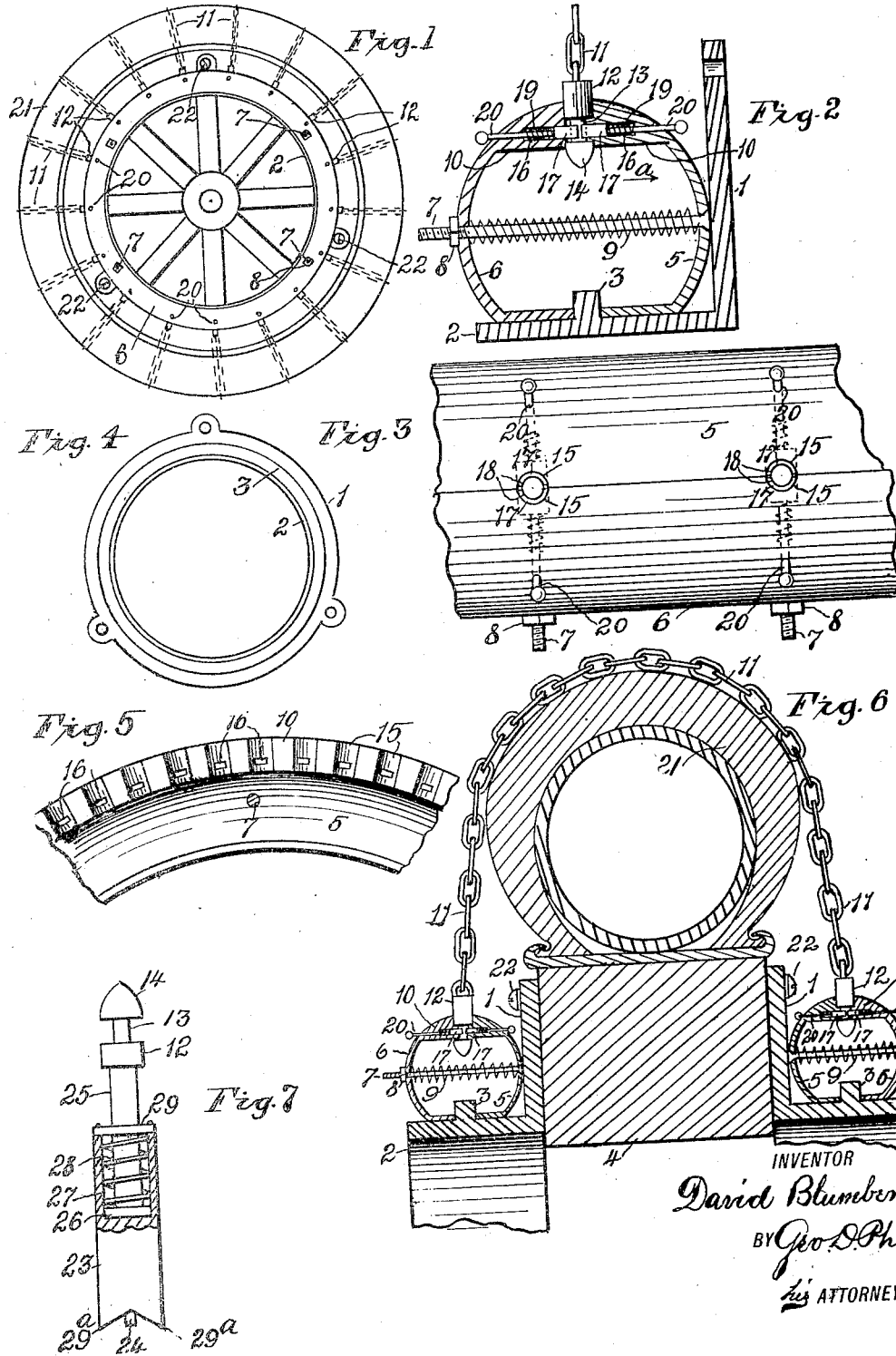

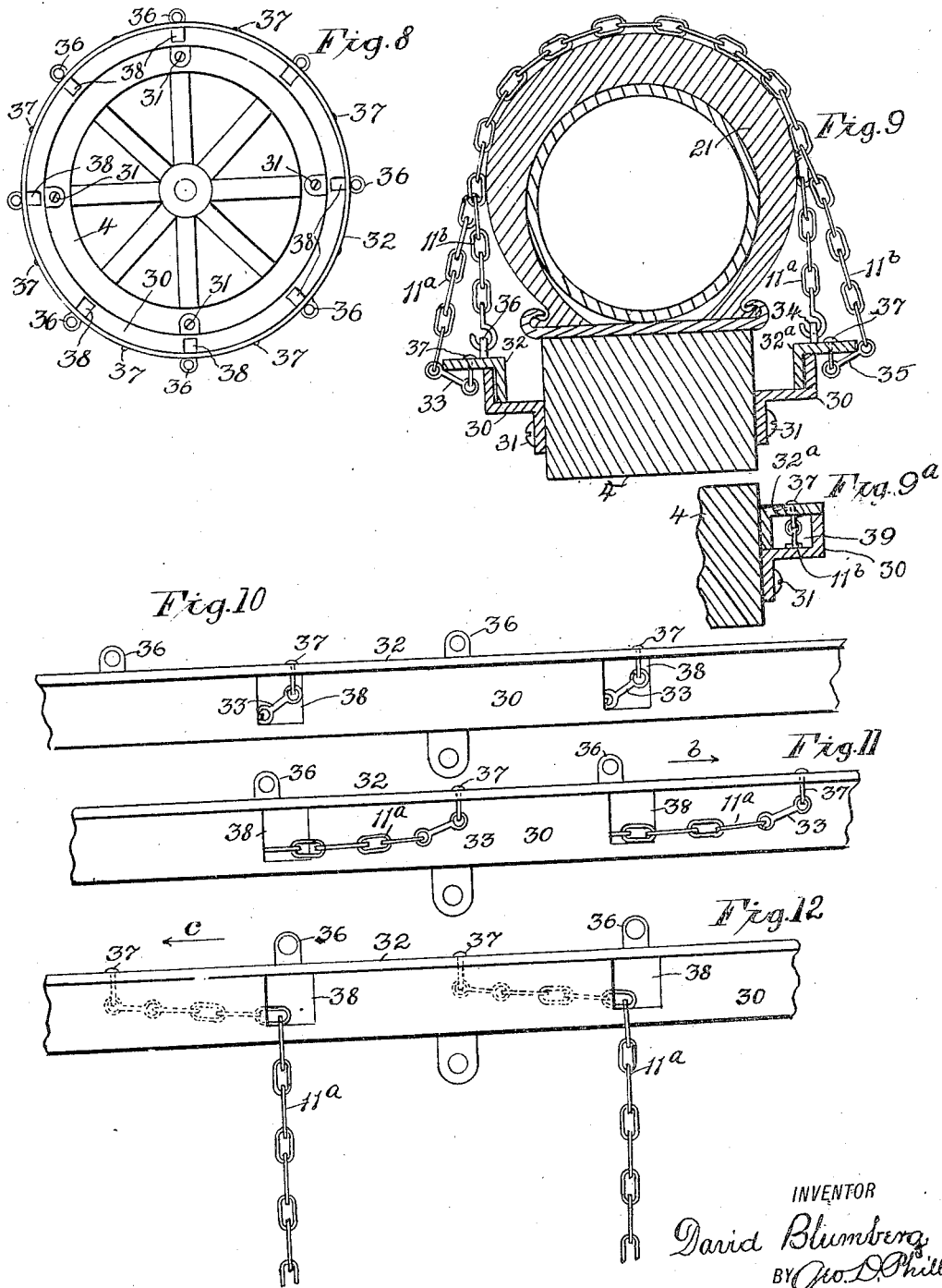

UNITED STATES PATENT OFFICE.

DAVID BLUMBERG, OF BRIDGEPORT, CONNECTICUT.

AUTO-TRACTION DEVICE.

1,291,380.  Specification of Letters Patent.  Patented Jan. 14, 1919.

Application filed December 10, 1917.  Serial No. 206,363.

*To all whom it may concern:*

Be it known that I, DAVID BLUMBERG, citizen of the United States, residing at Bridgeport, in the county of Fairfield and State of Connecticut, have invented certain new and useful Improvements in Auto-Traction Devices; and I do hereby declare the following to be a full, clear, and exact description of the invention, such as will enable others skilled in the art to which it appertains to make and use the same.

My invention relates to traction and non-skidding devices for motor vehicles, and it consists more particularly in providing carriers for the tread chains and a fixed track around which the carriers have freedom of motion.

Referring to the drawings:

Figure 1 represents a wheel equipped with a track, chain carrier and tread chains in operative position with respect to the tire;

Fig. 2 is an enlarged cross sectional view of the track and one of the chain carriers;

Fig. 3 is an enlarged broken plan view of one of the chain carriers;

Fig. 4 is a detail side elevation of one of the tracks;

Fig. 5 is a fragmentary view, on a reduced scale, showing an inside elevation of the chain carrier section 5;

Fig. 6 is an enlarged cross sectional view of a tire and felly of a wheel, and tracks for the same;

Fig. 7 is an enlarged detail modified view partly in section of one of the tread chain connections;

Fig. 8 is a view of a wheel showing a modified construction of the track and chain carriers mounted on the felly;

Fig. 9 is an enlarged cross sectional view of a felly, tire and the modified track and chain carriers in operative position;

Fig. 9ª is an enlarged broken sectional view of a felly, sectional view of one of the tracks and chain carriers showing the carrier withdrawn within the track;

Fig. 10 is an enlarged broken section of a track and chain carrier;

Fig. 11 is an enlarged broken section of the modified track and chain carrier showing the chain sections being withdrawn from the track;

Fig. 12 is an enlarged broken section of the modified track and chain carrier showing the chain sections being drawn into the track;

Fig. 13 is a side elevation of a truck felly showing a modified construction of the track and chain carriers adapted to be applied thereto;

Fig. 14 is a detail view of the spacing ring as applied to trucks;

Fig. 15 is an enlarged broken sectional view of the felly of a truck, broken view of one of the spokes, sectional view of the T-shaped tracks, and spacing rings, also a view of two of the chain carriers mounted on the tracks, and broken view of the tread chains carried by the carriers; and Fig. 16 is an enlarged detail upper plan view of one of the chain carriers.

Referring to Figs. 1, 2, 4 and 6, the track is of circular construction and angular in cross section, comprising the vertical flange portion 1 and the horizontal flange portion 2 provided with the circumferentially arranged rib 3. As there is a track located on the outside and inside of the felly 4, and each a duplicate of the other, and on each track is mounted a chain carrier of the same construction, these several duplicate elements will be designated by the same figures of reference.

The chain carriers are composed of the two sections 5 and 6. The former lies between the rib 3 and the flange 1 of the track, and the latter section on the outside of said rib, both bearing on the horizontal flange portion 2 of the track and adapted to rotate freely thereon. The chain carrier sections are connected together by the bolts 7 carrying nuts 8. These bolts are arranged at suitable intervals to properly support the close relation between the sections. On each bolt is mounted a spring 9 whose normal pressure is outward so that, when the nuts 8 are released, the outer section 6 will be carried away from the inner section 5.

The reinforced portion 10 of each chain carrying section is provided to afford sufficient support for the mechanism relating to the chain carrier connection as follows: At each end of the tread chains 11 is attached the connection 12 having the reduced neck portion 13, Fig. 2, and the tapered end 14. At suitable intervals around the meeting faces of sections 5—6 are semi-circular grooves 15, the grooves of one section registering with the grooves of the opposite section, and this relation is maintained by the before mentioned retaining bolts 7. In each of the reinforced portions of the sections is provided the angular openings 16, Fig. 5, to freely admit the gripping fingers 17, Fig. 2, having grooves 18 formed in their inner ends, Fig. 3, adapted to embrace the neck portion 13 of the chain connections under the impulse of the springs 19. 20 is a rod attached to each finger and projecting without the chain carrier sections to release the chain connections.

In connecting the tread chain sections 11 to the tire 21, one of the connections 12 is passed through the grooves 15 of the sections 5 and 6, forcing the gripping fingers 17 apart until they snap about the neck of the connection. The opposite end of the chain is then passed over the tire, and is attached to the opposite chain carrier as shown in Fig. 6.

The tracks for the chain carriers can be secured to any suitable part of the wheel. In the views shown they are secured to the felly 4 by screws 22.

In Fig. 7 is shown a modified construction of one of the chain connections adapted to arrest the lateral sway of a car on slippery roads. In this construction, the arrester 23 is adapted to occupy a position between each end of a tread chain and the chain connections, the end of a chain being attached to the staple 24. The elongation 25 of the chain connection is provided with the head 26 located at the bottom of the recess 27 of the arrester. 28 is a spring located between the plate 29 and said head. The lower end of the arrester has the sharp points 29$^a$ adapted to normally occupy a position an inch or so above the road bed when the tire is equipped with the tread chains. A sudden side sway of a car will tend to draw down the arrester until it engages the road bed, and the spring 28 will release it from the road bed as soon as the danger is past.

It will be readily seen that, as the traction of the wheel gradually shifts the position of the chain sections around the tire, the chain carriers will rotate on the track in keeping with the movement of the chains. The ends of the chains being anchored to the carriers an equal distance apart will always maintain this spaced relation whatever the position of the carriers may be.

The same general idea of the track and chain carriers is carried out in the modified construction shown in views 8 to 12, inclusive. This construction has the circularly arranged angular tracks 30 secured to the outside and inside of the felly 4 by screws 31, and the circularly arranged angular chain carriers 32—32$^a$ are mounted to rotate in these tracks. In this construction the chain sections are permanently attached by one end to the carriers as follows: 11$^a$ is the chain section permanently secured to carrier 32 by the link 33 and passes over the tire 21 and is temporarily attached to the staple 34 of the opposite carrier 32$^a$. Chain section 11$^b$ is permanently secured to carrier 32$^a$ by the link 35, and temporarily to the staple 36 of the opposite carrier 32. The swivels 37 to which these links are secured, turn freely in the carriers and thus avoid cramping the chain sections.

Openings 38 are provided in the tracks at the same distance apart as the swivels 37. When not in use, the chain sections are drawn into the pocket 39—Fig. 9$^a$ formed by pushing the chain carriers back as shown. When the chain sections are to be used, the chain carriers are rotated until the anchored ends of the chain sections are brought opposite these openings as shown in Fig. 10, then the carriers are pushed outward to carry these anchored ends outside of the tracks and the sections are withdrawn from the pockets, by turning the carrier in the direction of arrow $b$—Fig. 11, and are drawn into the pockets by reversing the movement of the carrier, viz: in the direction of arrow $c$ Fig. 12.

A still further modified track and chain carrier construction particularly adapted for heavy trucks is shown in views 13 to 16 inclusive. In this arrangement, the circumferential tracks 40 are T-shaped and are secured to the inside of the felly 4 and on each side of the spoke 41 by screws 42. On the part 40$^a$ of the tracks are freely mounted at intervals the chain carriers 43 having staples 43$^a$ to which the free ends of the chain sections 11$^c$ are temporarily attached. These multiple chain carriers are maintained a proper working distance apart by the spacing ring 44 having the notches 45. These rings are located on the inside of the tracks—Fig. 15, and the inner overhanging lips 46 of the carriers enter the notches of the spacing rings. 47 are outer overhanging lips of the carriers held in operative position by the bolts 48. By means of these movable lips any one of the carriers may be removed from the track by simply swinging this lip to one side after removing the track from the felly.

It will be observed that in all the views presented, the same general idea of chain carriers and tracks on which they have circumferential travel is carried out, and also the same general idea for maintaining a spaced relation between the tread sections.

Having thus described my invention, what I claim is:

1. In combination with a vehicle wheel, a circular track secured to the wheel at each side thereof and extending outwardly from the wheel sides, a circular rib extending outwardly from each track, sectional chain carriers having their inner sides engaged with opposite sides of the ribs, means to connect the sections of the carriers to each other, and chains connected to the carriers and extending across the wheel tread.

2. In combination with a vehicle wheel, a circular track secured to each side of the wheel, a circular chain carrier rotatable on each track and composed of two sections, means for connecting the sections, chains traversing the wheel tread, and means independent of said connecting means for securing the ends of the chains to the respective carriers.

3. A device for motor vehicle wheels comprising a circularly arranged track secured to a wheel and on each side thereof, a circular two section chain carrier journaled on each track adapted to make a complete revolution thereon, spring actuated gripping fingers operatively mounted in each carrier section, chain sections, and means on each end thereof to interlock with the gripping fingers located on each side of the wheel.

4. A device for motor vehicle wheels comprising a circularly arranged track secured to the wheels and on each side thereof, carriers mounted to have a free movement on the tracks, chain sections permanently connected by one end to the carrier on one track and removably connected to the opposite carrier, and means for housing the chain sections when one end thereof is free.

5. In combination with a vehicle wheel, a circular track secured to the wheel at each side thereof and extending outwardly from the wheel sides, hollow chain carriers having sockets rotatably mounted on the tracks, chains extending across the wheel treads, means connected to the chains and engaging in said sockets of the carriers so as to project within the interiors of the carriers releasable and means located within the carriers to engage said means of the chains to anchor the latter to the carriers.

6. In combination with a vehicle wheel, a circular member on each side thereof having a vertical part and a horizontal track, a circular rib on each track, chain carriers rotatable on the tracks and formed to receive the ribs so as to be held thereby in close relation to the vertical parts of the members, and chains traversing the wheel tread and secured to the carriers.

In testimony whereof I affix my signature.

DAVID BLUMBERG.